May 26, 1936. T. W. BEHAN 2,041,686
WRINGER
Filed April 30, 1932 10 Sheets—Sheet 1
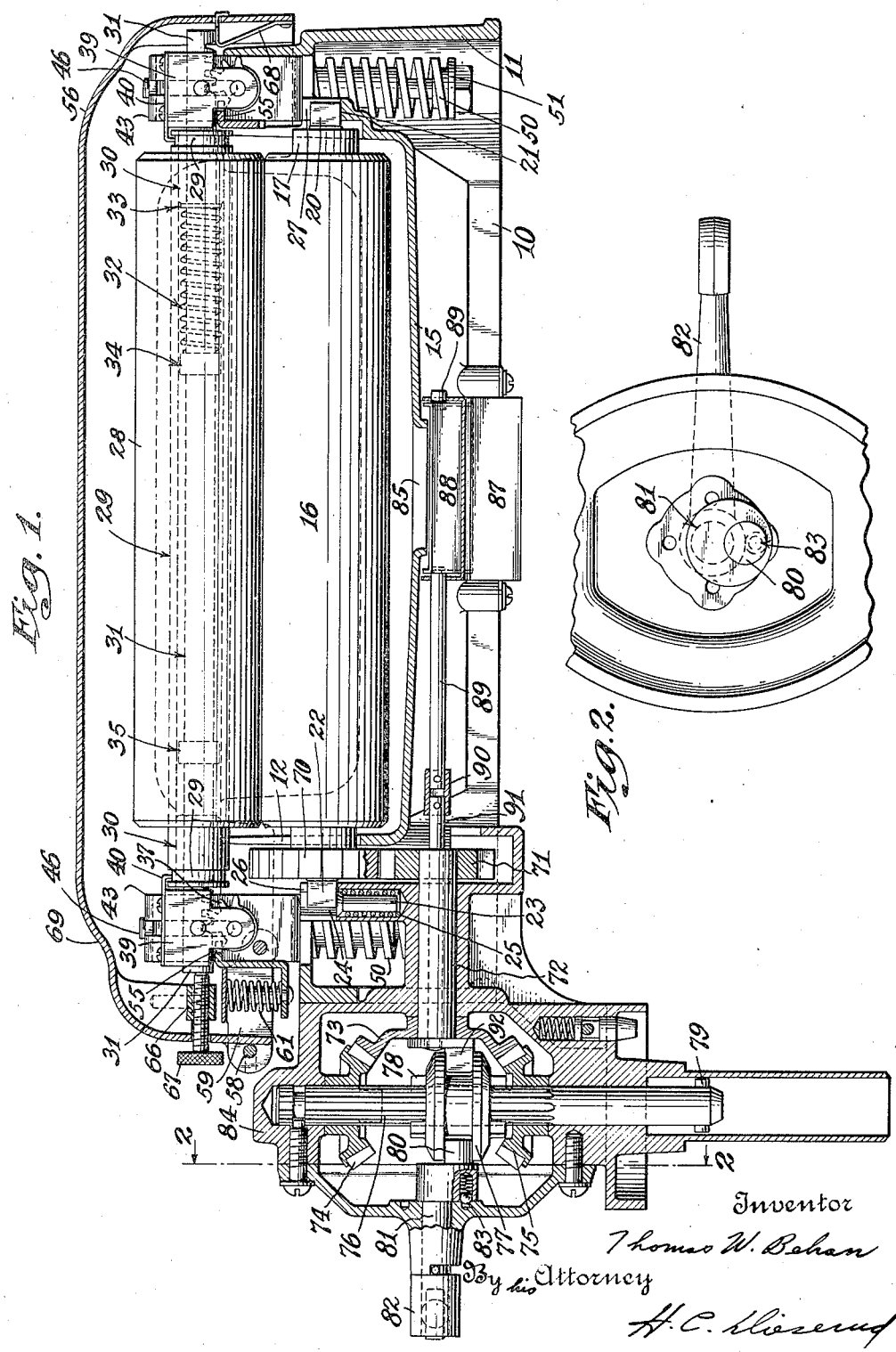
Inventor
Thomas W. Behan
By his Attorney
H. C. Lieserung

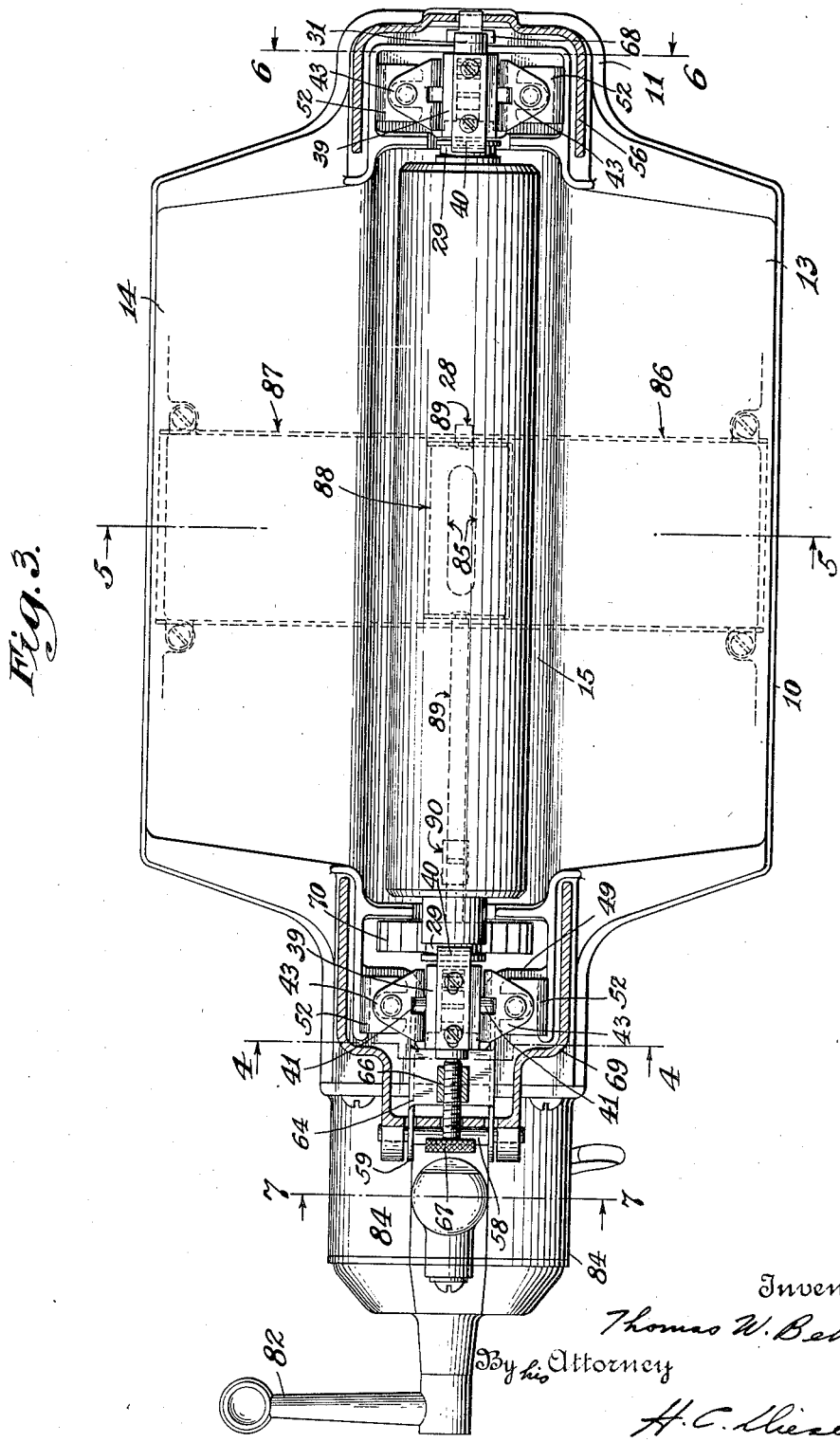

May 26, 1936. T. W. BEHAN 2,041,686
WRINGER
Filed April 30, 1932 10 Sheets-Sheet 4

Inventor
Thomas W. Behan
By his Attorney

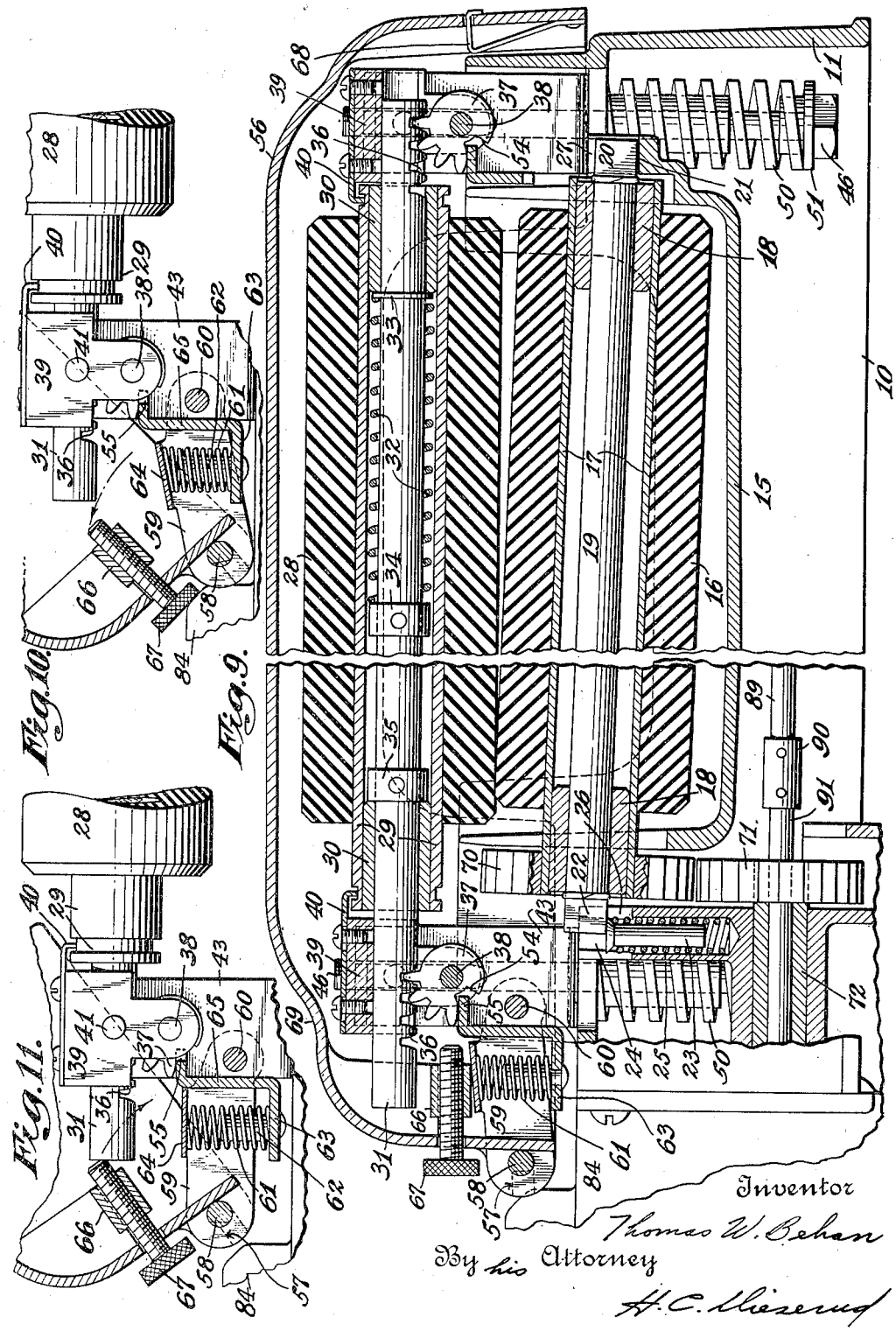

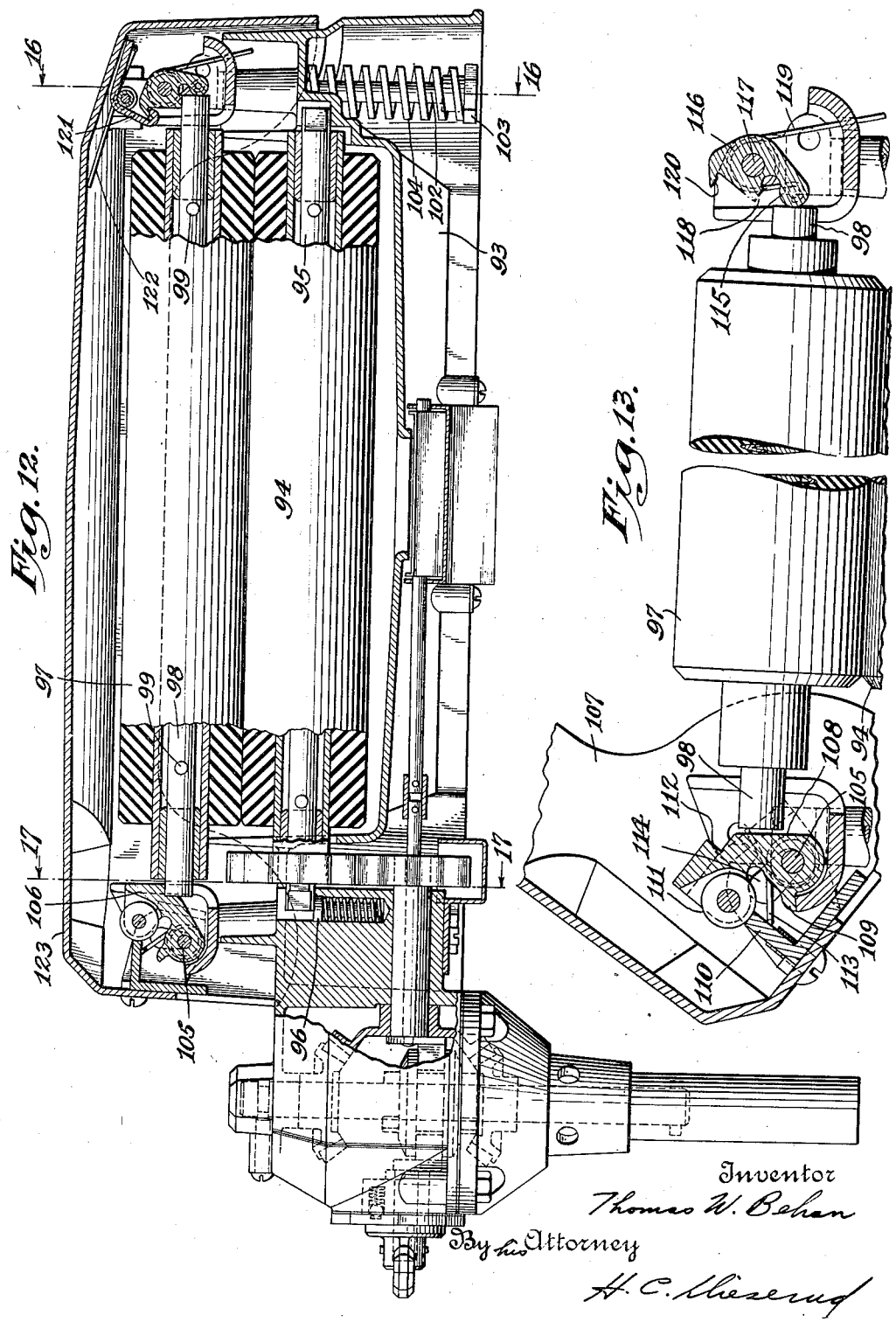

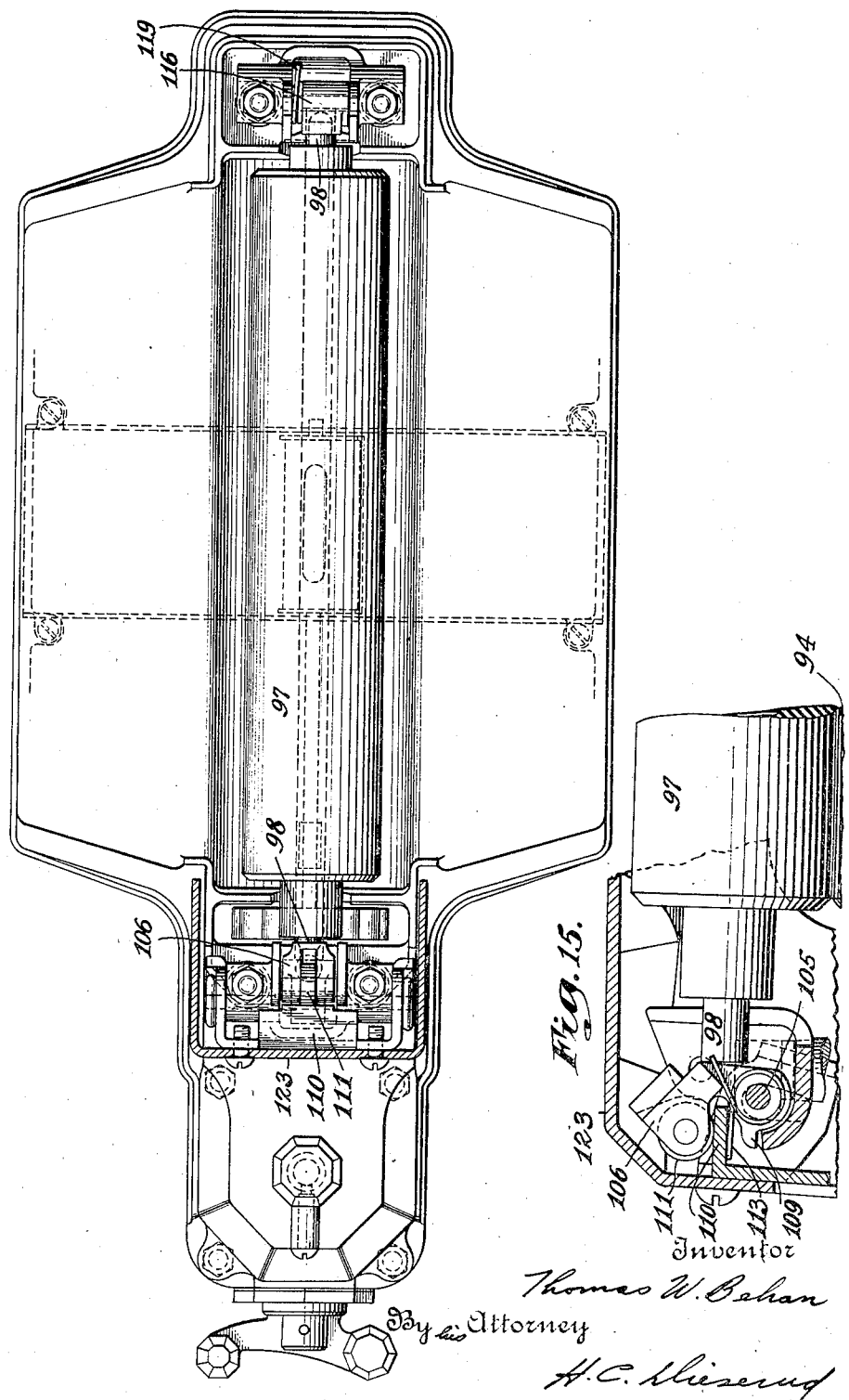

May 26, 1936.  T. W. BEHAN  2,041,686
WRINGER
Filed April 30, 1932  10 Sheets-Sheet 8

Inventor
Thomas W. Behan
By his Attorney
H. C. Liesen

May 26, 1936. T. W. BEHAN 2,041,686
WRINGER
Filed April 30, 1932 10 Sheets-Sheet 10

INVENTOR
Thomas W. Behan
BY
H. C. Liesener
ATTORNEY

Patented May 26, 1936

2,041,686

UNITED STATES PATENT OFFICE 2,041,686

WRINGER

Thomas W. Behan, Binghamton, N. Y., assignor to Nineteen Hundred Corporation, Binghamton, N. Y., a corporation of New York Application April 30, 1932, Serial No. 608,391

30 Claims. (Cl. 68—32)

This invention relates to wringers of the type employed in connection with domestic clotheswashing machines. It has been a primary object of the invention to provide a device of this character which is low and compact in structure and free of projecting handles or the like. The construction is such as to present a particularly pleasing effect and due to the absence of external, movable parts the likelihood that the clothes being handled, or the clothing of the operator, will become entagled is reduced to a minimum.

A feature of the invention is the manner of controlling the application and release of pressure between the rotatable wringer rolls. The arrangement is such that a pivoted cover member upon being rocked into closed position will serve to place the rollers under tension, the cover at the same time becoming latched. To release the pressure it is simply necessary to strike the cover adjacent its pivot. This not only disconnects the tensioning devices but also releases the cover so that it may be lifted and then returned to restore the pressure between the rollers.

A general object of the invention has been to simplify the construction and arrangement of the various parts and to render their operation easy, effective, safe and simple. The application of tension between the rollers is effected by a simple motion of one element, the cover, and it is not necessary to vary the tension of the springs, except as desired, when they are once adjusted. This insures restoration of precisely the same pressure between the rolls after release as existed prior to release and saves considerable time and trouble in the restoration of pressure after each release.

The construction contemplated is such that the wringer rollers may be connected to the operating mechanism of the washing machine for either direction of rotation or the clutch may be placed in a neutral position. Water which is wrung from the clothes is automatically returned through suitable channels to the side of the wringer from which the clothes are being fed into the bight of the rollers. A feature of the invention is the provision of a simple and light construction for directing the water to either side of the wringer depending upon the direction of rotation of the rollers. A light deflector in the path of the water is rocked into one position or another directly under control of a lever which operates the clutch associated with the rollers.

The operating connections for driving the rolls are such that the lower or driven roller is disconnected from the driving pinion automatically, in a simple and effective way, as soon as pressure is relieved between the rollers. This is accomplished by simply supporting one end of the lower roller on a spring plunger.

Numerous other objects and advantages of the invention will appear from a detailed description of several illustrative embodiments of the same which will now be given in conjunction with the accompanying drawings in which:

Fig. 1 is a vertical, longitudinal section through the wringer and operating connections showing the rollers in operative position.

Fig. 2 is a transverse, sectional view along the line 2—2 of Figure 1.

Fig. 3 is a top plan view of the wringer with the cover shown in section.

Fig. 9 is a longitudinal, vertical section through the rolls with the tension released.

Figs. 10 and 11 are detail views illustrating the relation between one end of the cover and the upper roller under different conditions.

Fig. 12 is a view similar to Figure 1 showing a modified construction.

Fig. 13 is an enlarged sectional view showing the relation between the upper roller and cover when the latter is tilted open.

Fig. 14 is a top plan view of the wringer shown in Figure 12 with only one end of the cover shown in section.

Fig. 15 is a detail view, partly in section, showing the relation between the cover and one end of the upper roller after the pressure has been released.

Figure 4:
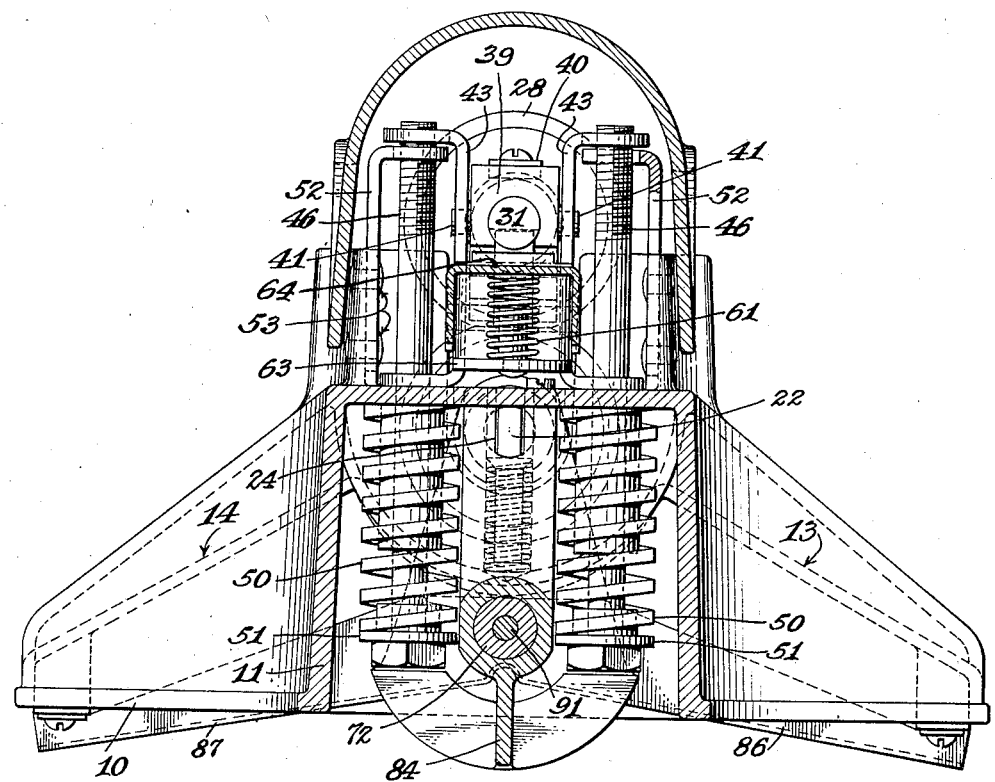
Fig. 4 is an enlarged, transverse, sectional view along the line 4—4 of Figure 3.
Figure 5:
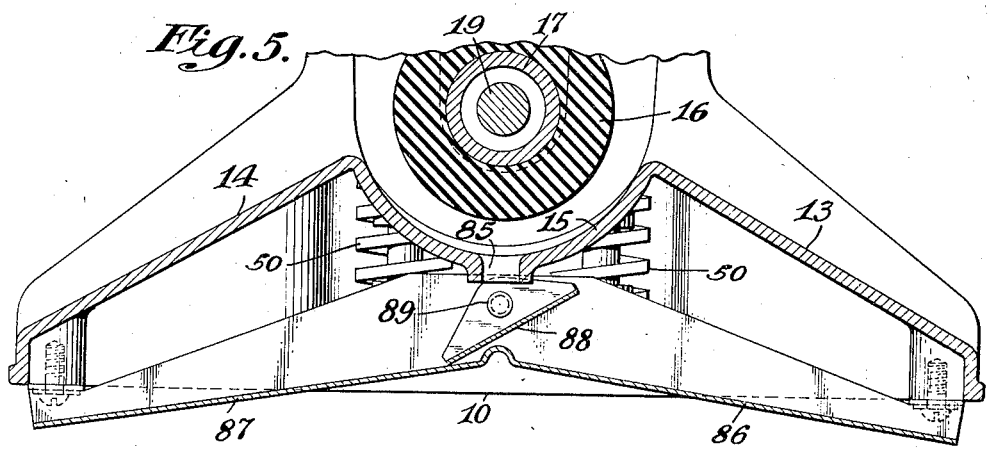
Fig. 5 is an enlarged, partial, sectional view along the line 5—5 of Figure 3.
Figure 6:
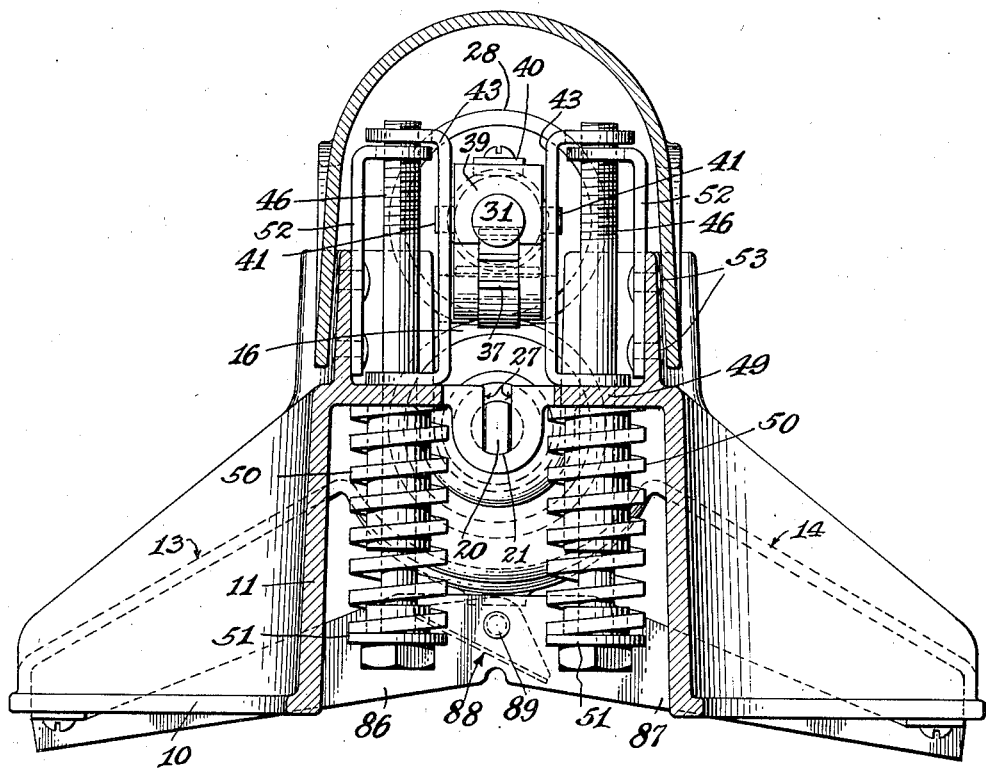
Fig. 6 is an enlarged, transverse section taken along the line 6—6 of Figure 3.

Referring now particularly to Figures 1 to 11, inclusive, of the drawings, which illustrate one embodiment of the invention, there is shown a main frame member 10 forming the bottom of the wringer structure and having two upwardly extending side portions 11 and 12. Extending laterally from the main frame, and preferably formed integrally therewith, there may be provided a pair of clothes guides 13 and 14. These are preferably inclined at a suitable angle downwardly in opposite directions. Their inner edges may be suitably joined by an integral, semi-cylindrical portion 15 forming a trough beneath the lower roller 16 of the wringer. This roller may be of any suitable construction comprising, for example, an outer rubber body mounted upon a hollow sleeve member 17. At each end of the sleeve there may be inserted a bushing 18 formed of brass, or other suitable bearing material. These bushings surround a solid shaft 19 and permit free rotation of the roller about this shaft. At its right end (Fig. 1) the shaft 19 is provided with a flat-sided portion 20 supported directly by a shoulder 21 formed in the frame member. At its opposite end the shaft may be formed with a similar flat-sided portion 22 supported by a plunger 23 mounted within a recess 24 in the frame member. A spring 25 surrounding the plunger may cooperate with the head of the latter and with the bottom of the recess to normally urge the plunger upwardly. This spring will be of sufficient strength to lift the end of the roller when it is not subjected to pressure from above, for a purpose to be explained hereinafter. A suitable guideway 26 is provided in the frame to cooperate with the portion 22 of the shaft, serving both as a guide in the vertical movements of the shaft and as a means for preventing rotation of the shaft. A similar guideway 27 is formed at the opposite end of the frame to receive and guide the portion 20 of the shaft.

Above the roller 16 there is mounted a similar roller 28 formed, for example, of rubber mounted on a sleeve 29 carrying brass bushings 30 at each end. A solid shaft 31 is passed through the bushings and serves as a support for the roller. The roller is adapted to rotate freely upon this shaft and the latter is permitted a free sliding movement within the roller. A spring 32 surrounds the shaft within the sleeve 29, one end of the spring engaging a washer 33 loosely surrounding the shaft and the other end engaging a collar 34 pinned or otherwise secured to the shaft. This arrangement is such that the shaft will normally be forced toward the left (Figs. 1 and 9) until a second collar 35, secured to the shaft, engages the bushing 30 at the left end of the roller. The shaft will, however, be permitted to shift to the right, simply compressing the spring 32. At each end the shaft is provided on its under side with a series of rack-teeth 36 adapted to mesh with the teeth formed on segmental members 37. The members 37 are mounted for rotation upon stub shafts 38 carried by downwardly extending projections or ears of blocks 39 supported by the ends of the shaft 31. The mounting of these blocks is such that they will not interfere with the free sliding movement of the shaft. They may suitably be connected with the ends of the sleeve 29 by means of fingers 40 secured to the blocks and having bent portions cooperating with grooves formed near the ends of the sleeve. This arrangement is such that the sleeve 29 may rotate freely without causing rotation of the blocks 39 while the latter will be held in the proper longitudinal relation to the sleeve during the sliding movements of the shaft 31.

Figures 7, 8:
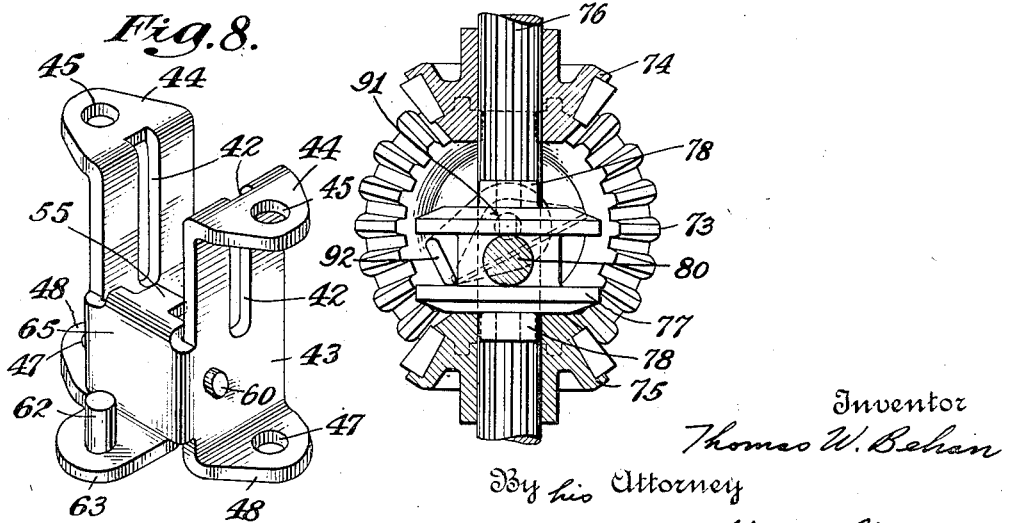
Fig. 7 is a detail sectional view along the line 7—7 of Figure 3 showing the driving gears and clutch.
Fig. 8 is a perspective view of a spring tensioned frame at the left end of the wringer as viewed in Figure 1.
Figure 16:
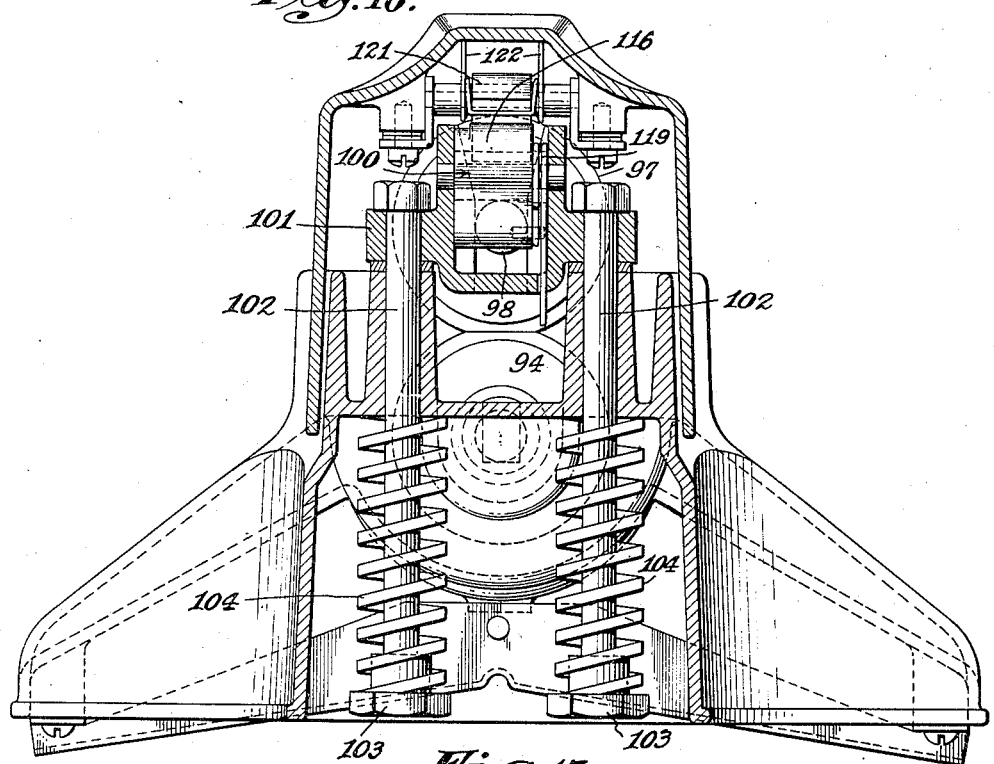
Fig. 16 is an enlarged transverse, sectional view along the line 16—16 of Figure 12.
Figure 17:
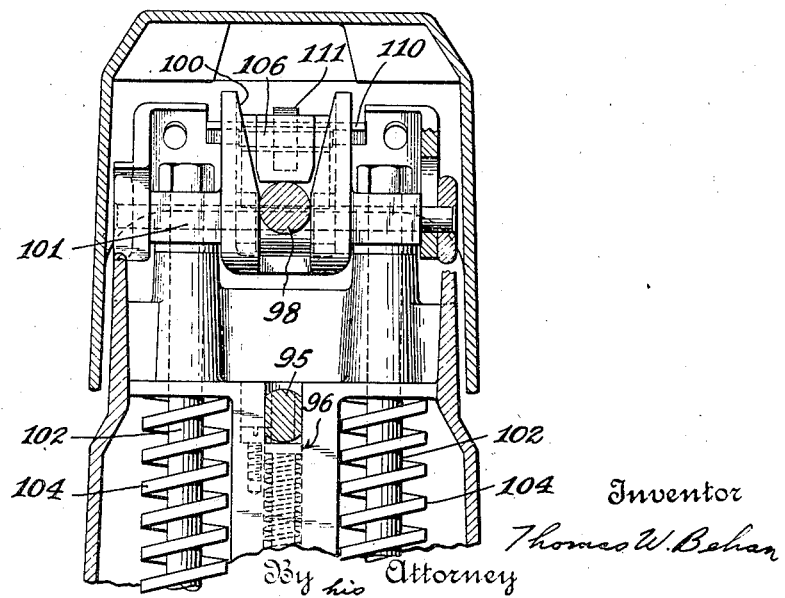
Fig. 17 is a similar view along the line 17—17 of Figure 12.
Figure 18:
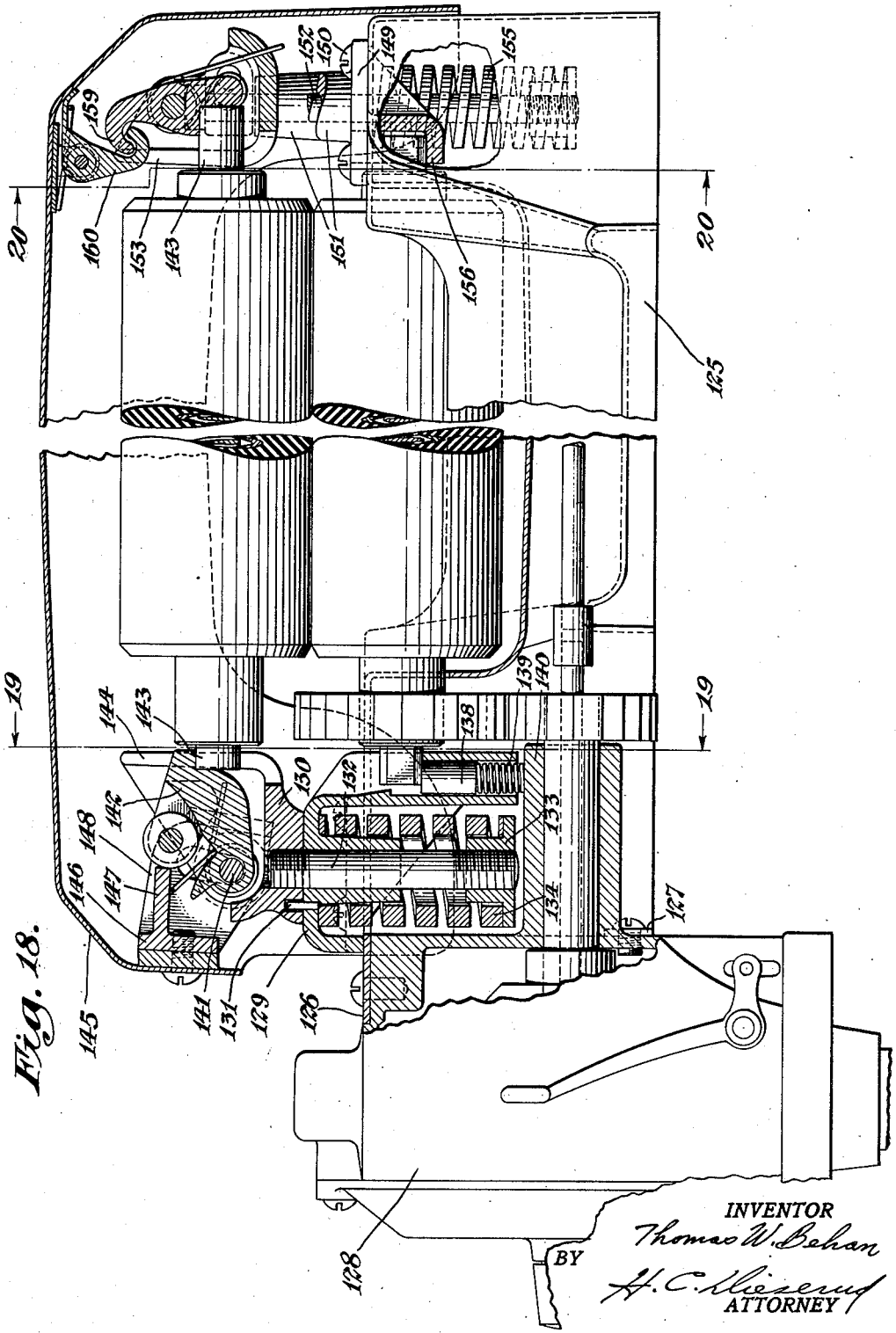
Fig. 18 is a longitudinal view partly in section and partly in elevation through a further modified construction.
Figure 19:
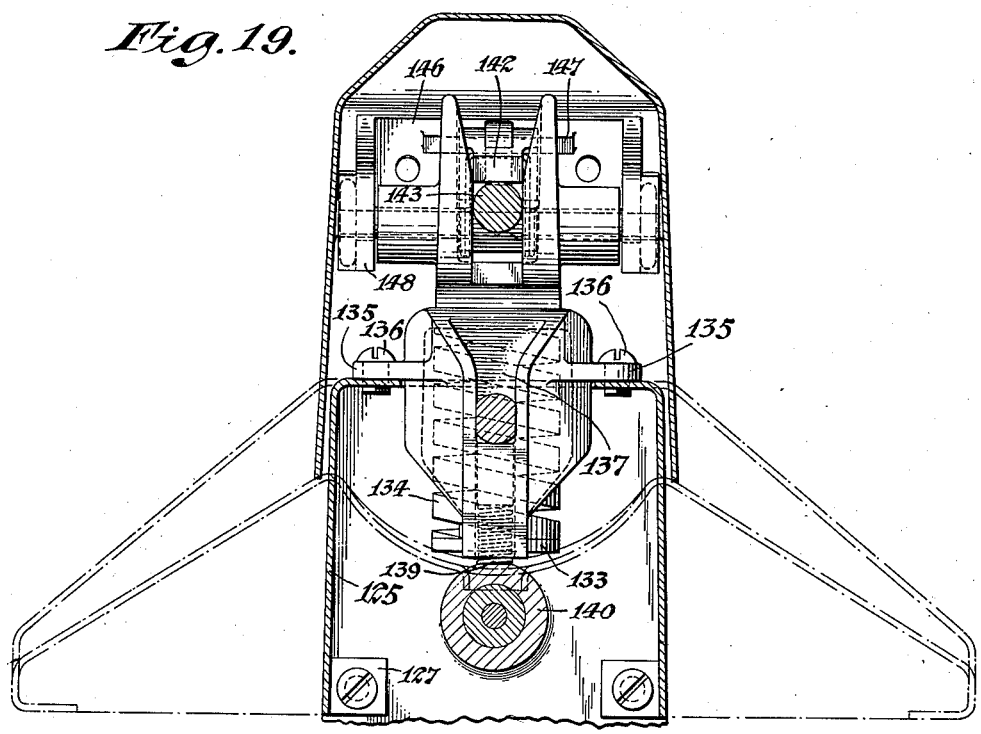
Fig. 19 is a vertical section along the line 19—19 of Figure 18.
Figure 20:
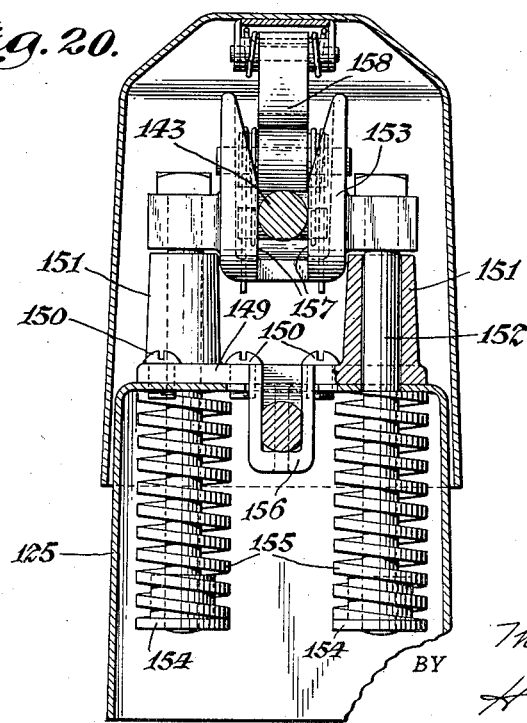
Fig. 20 is a vertical section along the line 20—20 of Figure 18.

The blocks 39 are provided with laterally extending pins or projections 41 adapted to cooperate with guide grooves or slots 42 formed in brackets 43. It will be understood that a bracket 43 of the general type disclosed in Fig. 8 is provided at each end of the roller, although there is a slight difference between the brackets at the two ends, as will more clearly appear hereinafter. At their tops the brackets are provided with outwardly extending projections or ears 44 formed with threaded openings 45 adapted to receive the upper ends of bolts 46. These bolts have screw-threaded engagement with the projections 44 and are passed through openings 47 in similar lateral projections 48 formed at the lower ends of the brackets. These projections 48 normally rest upon ledges 49 integral with the main frame. Beneath these ledges each bolt 46 is surrounded by a spring 50 which acts at its upper end against the under side of the ledge and at its lower end against a washer 51 which engages the head of the bolt. In this way it will be apparent that the bolts are forced downwardly and at the same time draw the brackets 43 downwardly. It will be understood that the bolts pass freely through openings in the ledges 49 and the tension of the springs 50 may be varied to suit the particular requirements by simply turning the heads of the bolts. In order to guide the bolts adjacent their upper ends they may be passed through brackets 52 secured in any way, as by rivets 53, to the main frame. These brackets are provided with openings which permit the free passage of the bolts.

Each of the pivoted members 37 is provided with a shoulder 54 which, upon rotation of the member, is adapted to engage the under side of a tongue 55 integral with the bracket 43. It will be apparent that as the shaft 31 is forced toward the right (Fig. 9), the members 37 will be rotated until the shoulders 54 engage the tongues 55. The two ends of the upper roller will then be drawn downwardly until the downward movement of this roller is arrested by its contact with the lower roller and the engagement of the portions 20 and 22 of the lower shaft with solid portions of the frame. Any continued movement of the members 37 will then simply compress the material of the rollers and slightly raise the brackets 43 against the tension of the springs 50. This will increase the tension of these springs to a desirable extent. It will be apparent that any tendency to separate the rollers by the passage of clothes between them will simply cause the brackets 43 to be lifted further against the resistance of the springs.

Shifting of the shaft 31 longitudinally of the upper roller is effected by means of the cover 56. This cover at its left end (Figs. 1 and 9) is provided with ears having slots 57 adapted to engage a rod 58 carried by a frame 59. This frame is in turn pivotally mounted by means of a rod 60 upon a portion of the main frame. A spring 61 surrounding a stud 62 and compressed between an extension 63 of the bracket 43 at the right end of the wringer and a shelf 64 extending transversely across the frame 59 tends to rock the latter in a clockwise direction until the shelf 64 engages the upright portion 65 of the bracket 43.

At the end of the cover there is mounted a lug 66 adapted to receive a screw 67 which may be adjusted into any suitable position. The end of this screw is adapted to engage the end of the shaft 31 when the cover is tilted, in the manner best indicated in Fig. 11. Now, as the cover is rocked downwardly into the position indicated in Fig. 1, the end of the screw 67 will follow the path indicated by the arrow in Fig. 11. This will, obviously, cause the shaft 31 to be shifted to the right, thereby rocking the sectors 37, connecting the two ends of the roller 28 with the brackets 43, and applying a slight additional tension to the springs connected with these brackets. When the cover reaches its normal, closed position a spring-latch member 68 is carried beneath the right end of the shaft 31, which at this time is projected to a sufficient extent beyond the member 39. It will be apparent that as the latch 68 is forced over the end of the shaft, it will be pressed against the end of the cover but upon clearing the bottom of the shaft will spring into the position shown in Fig. 1. In this way the parts will be locked in their set positions with the rolls under tension.

When it is desired to release the tension of the rolls, as when an excess amount of clothing has been caught between them or the fingers of the operator have been caught, it is simply necessary to strike the cover at a point 69 adjacent its pivot so that this end of the cover will be depressed. Striking of the cover in this way will carry the end of the screw 67 beneath the end of the shaft 31, this being permitted by the rocking of the frame 59 into the position shown in Fig. 9. Upon disengagement of the end of the shaft 31, the spring 32 will shift it to the left, thereby rocking the members 37 to disengage the shoulders 54 from the projections 55. At the same time the right end of the shaft will be withdrawn from the path of the latch 68 so that the cover may be lifted when desired. The parts will remain in the position shown in Fig. 9 until the cover is again tilted into the position shown in Fig. 10. The spring 61 may then act to lift the frame 59 and the end of the cover to bring the parts into the position shown in Fig. 11 for a repetition of the spring tensioning operation. It will be clear from this explanation that no release of the tension on the springs 50 is required in bringing the parts into their operative relation. A simple movement of the cover suffices to restore the tension between the rollers. In this way it is insured that the same amount of pressure will always be provided between the rollers. Due to the great leverage afforded by the cover, the amount of force required to place the rolls under tension is reduced to a minimum.

For the purpose of driving the rollers, a gear 70 is preferably secured to the sleeve 17 of the lower roller. This gear is adapted to mesh with the teeth of a gear 71 secured to a shaft 72, which at its other end carries a bevel gear 73. A pair of bevel pinions 74 and 75 loosely mounted upon a shaft 76 may be in constant mesh with the gear 73. A clutch member 77 having projections 78 on its upper and lower sides may be splined to the shaft 76 so as to rotate therewith and be slidable thereon. The shaft 76 may be connected in the usual way with a suitable power source by means of pins or projections 79 at its lower end. Any appropriate means may be provided for shifting the clutch member to determine the direction of rotation of the rollers by engaging the lower projections 78 with recesses in the pinion 75 or the upper projections 78 with recesses in the pinion 74, or by maintaining the clutch in an intermediate, neutral position. For example, a pin 80 cooperating with an annular groove around the clutch member may be shifted into any one of three positions by the rotation of a shaft 81 on which the pin is eccentrically mounted. The shaft may have connected to its outer end a suitable handle 82 for shifting it into any of its three positions, as desired. A spring pressed ball 83 cooperating with recesses in the cover of a gear housing 84 may serve to frictionally retain the parts in any adjusted position.

In the operation of the wringer, as the rollers are brought together under pressure in the manner explained, the left end of the lower roller will be depressed against the action of the plunger 23 so as to carry the teeth of the gears 70 and 71 into mesh. When pressure is released, the plunger 23 will lift the left end of the shaft into the position shown in Fig. 9, in which the driving connection between the gears 70 and 71 is broken. As clothes are fed between the rotating rollers 16 and 28, the water which is squeezed from them will be collected in the trough formed by the portion 15 of the frame and will be discharged through an opening 85 at the bottom of this trough. This opening communicates with a drainage channel having laterally extending branches 86 and 87 which serve to direct the water either to one side or the other of the wringer. This channel member may be secured to the under side of the frame 10 beneath the clothes guides in any suitable way, as by means of the screws shown. In order that the water squeezed from the clothes may be returned to the tub from which the clothes are taken, a deflector 88 is mounted beneath the opening 85. This deflector is pivotally supported and may be so positioned as to direct the water either into the branch 86 or into the branch 87, as desired. Preferably this deflector will be automatically adjusted in accordance with the direction of rotation of the rollers. For this purpose the shaft 89 connected with the deflector may be connected by a coupling 90 with a shaft 91 which is passed through an opening extending longitudinally of the shaft 72. At the left end of the shaft 91 there may be mounted an arm having a projection 92 cooperating with the groove in the clutch member 77. It will be apparent that by this arrangement any movement of the clutch element will be communicated to the shaft 91 and hence to the deflector 88 so that the water may be diverted in a direction corresponding with the direction of rotation of the rollers.

Referring now to Figs. 12 to 17, inclusive, there is shown a modified construction for accomplishing substantially the same purpose as the construction shown in Figs. 1 to 11, inclusive. A frame member 93 may be adapted to support in the same way a lower roller 94 which is rotatably carried by a solid shaft 95 resting upon a fixed shoulder of the frame at its right end and upon a spring pressed plunger 96 at its left end. The upper roller 97 may be loosely mounted upon a shaft 98 which is somewhat similar to the shaft 31. No spring is provided, however, for shifting this shaft toward the left. It is simply provided with pins 99 adapted to cooperate with the bushings at the ends of the roller for limiting the relative longitudinal movement between the shaft and the roller. The ends of the shaft 98 are received by grooves or slots 100 formed in brackets

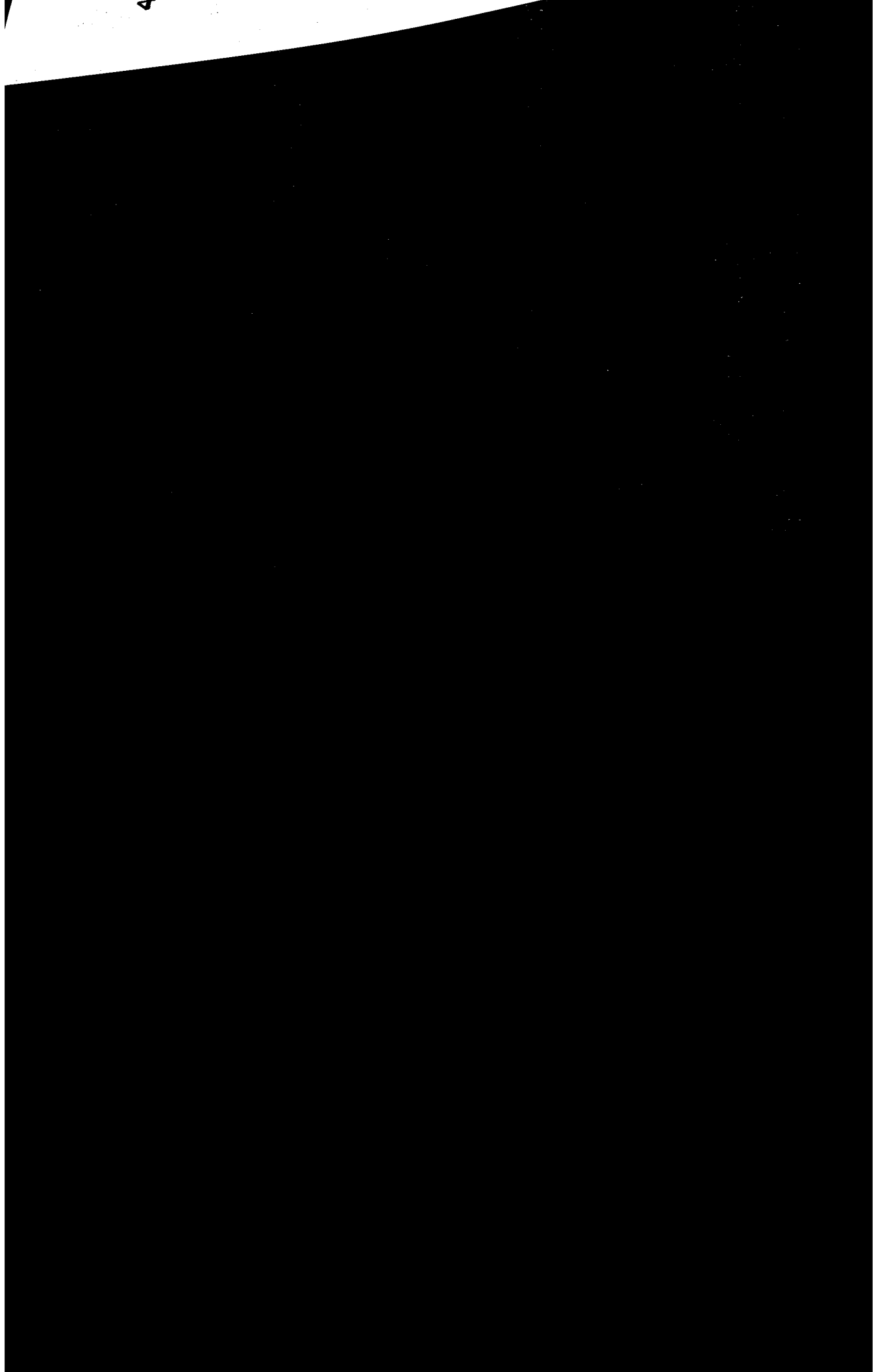

of Figs. 12 and 13. The casting 146 is provided with side arms 148 bearing elongated slots functioning in the same manner as the slots 114 of Fig. 13.

Adjacent the opposite end of the frame 125 there is provided another spring unit including a casting 149 adapted to be secured to the pressed frame in any suitable way as by means of screws 150. The spring unit at this end of the frame may, if desired, be of a construction similar to that at the opposite end, although it is convenient to modify the construction somewhat to provide for a pair of tensioning springs in lieu of only one. For this purpose the member 149 may suitably be provided with upstanding bosses 151 adapted to receive bolts or rods 152 which are first passed through an upper member 153 of the spring unit. At their lower ends the bolts 152 are provided with circular nuts 154 adapted to support the lower ends of a pair of springs 155. The upper ends of these springs may bear against an under surface of the frame 125 or if desired this frame may be provided with openings of suitable diameter to permit the passage of the springs 155 and the upper ends of the latter may then be permitted to directly engage the under surface of the casting 149. If this latter arrangement is adopted, the spring unit will be made completely detachable as a whole, while if the springs are arranged to engage the under surface of the frame 125, it will be necessary to remove the nuts 154 and the springs 155 before removal of the unit as a whole.

A downwardly extending pocket 156 carried by the member 149 is adapted to receive and support the right end of the supporting shaft for the lower roller. The upper member 153 is provided with a channel 157 adapted to receive and guide the supporting shaft for the upper roller. A member 158, similar in form and function to the member 116 of Fig. 13, is pivotally supported by the upper member 153. Its operation is believed to be clear from the detailed description of the other construction which has already been given. It may suitably be provided with a hooked extension 159 adapted to cooperate with a latch 160 carried by the cover 145. Inasmuch as the operation of this form of the invention is substantially the same as that of the form shown in Figs. 12 to 17, inclusive, it is believed unnecessary to include a resumé of its operation.

While several illustrative forms of the invention have been described in considerable detail, it will be understood that various modifications in the construction and arrangement of the parts may be made without departing from the general spirit and scope of the invention as defined by the claims.

What I claim is:

1. In a wringer a main frame, a cover therefor, a pair of rollers removably carried by said main frame independently of said cover, spring tensioning means in said frame completely disconnected from said rollers and permitting ready removal thereof when said wringer is released, means for connecting one of said rollers with said tensioning means to create pressure between the rollers, said last mentioned means comprising a member extending substantially from end to end of said rollers and bodily slidable longitudinally of said rollers.

2. In a wringer a pair of rollers, spring tensioning means, means for connecting one of said rollers with said tensioning means to create pressure between the rollers, said last mentioned means comprising a longitudinally slidable shaft mounted within one of said rollers.

3. In a wringer a frame, a pair of rollers mounted therein, a cover over said rollers pivotally connected with said frame, spring tensioning means mounted in said frame and disconnected at times from said rollers, and means controlled by said cover upon pivotal movement thereof for releasably connecting said tensioning means with one of said rollers to create pressure between the rollers.

4. In a wringer a frame, a pair of rollers freely mounted therein, a cover over said rollers connected with said frame, spring tensioning means mounted in said frame disconnected at times from said rollers, and means controlled by said cover upon movement thereof for releasably connecting said tensioning means with one of said rollers to create pressure between the rollers and simultaneously applying tension to said tensioning means.

5. In a wringer a frame, a pair of rollers mounted therein, a cover over said rollers pivotally connected with said frame, spring tensioning means disconnected at times from said rollers, and means controlled by said cover for releasably connecting said tensioning means with one of said rollers to create pressure between the rollers, a portion of said cover being movable with respect to said frame, said cover controlled means being so constructed and arranged with relation to said movable portion as to effect release of said tensioning means upon striking said cover.

6. In a wringer a frame, a pair of rollers mounted therein, a cover over said rollers pivotally connected with said frame, said cover being depressible adjacent its pivot spring tensioning means, and means controlled by said cover for releasably connecting said tensioning means with one of said rollers to create pressure between the rollers, said cover controlled means being so constructed and arranged in relation to the cover as to effect release of said tensioning means upon depressing said cover adjacent its pivot.

7. In a wringer a frame, a pair of rollers mounted therein, a cover over said rollers pivotally connected with said frame at one end only, said cover being readily shiftable bodily adjacent its pivot, and means controlled by the pivotal movement of said cover for creating pressure between the rollers, said means being controlled by the bodily movement of the cover adjacent its pivot to release said pressure.

8. In a wringer a frame, a pair of rollers mounted therein, a cover over said rollers pivotally connected with said frame, said cover being shiftable bodily adjacent its pivot, and means including a longitudinally movable member within one of said rollers controlled by the pivotal movement of said cover for creating pressure between the rollers, said means being controlled by the bodily movement of the cover adjacent its pivot to release said pressure.

9. In a wringer a frame, a pair of rollers mounted therein, a cover over said rollers pivotally connected with said frame, spring tensioning means, a member slidably mounted within one of said rollers, said member being shifted longitudinally by said cover upon the pivotal movement thereof for releasably connecting said tensioning means with one of said rollers to create pressure between the rollers.

10. In a wringer a frame, a pair of rollers mounted in said frame, spring tensioning means carried by said frame, pivoted members adapted to connect said means with the ends of one of said rollers, resilient means normally urging said members to disconnect said tensioning means from the ends of said roller, and a longitudinally slidable member for controlling said members to connect the same with said roller.

11. In a wringer a frame, a cover movably mounted on said frame, a pair of rollers mounted in said frame, spring tensioning means carried by said frame, pivoted members adapted to connect said means with the ends of one of said rollers, and a longitudinally slidable member for controlling said members, said slidable member being operated by movement of said cover relative to said frame.

12. In a wringer a frame, a pair of rollers mounted therein, a cover over said rollers pivotally connected with said frame, spring tensioning means, means operated by said cover to releasably connect said tensioning means with one of said rollers to create pressure between the rollers, and a latch for retaining said cover only when said tensioning means is so connected.

13. In a wringer a frame, a pair of rollers mounted therein, a cover over said rollers pivotally connected with said frame, spring tensioning means, means controlled by said cover for releasably connecting said tensioning means with one of said rollers to create pressure between the rollers, and a latch for retaining said cover when said tensioning means is so connected, said tensioning means and said latch being released upon striking said cover.

14. In a wringer a frame, a pair of rollers each removably mounted on said frame, tensioning means carried by said frame, a cover pivotally connected with said frame, the pivot of said cover being bodily shiftable, rockable elements for connecting said tensioning means with one of said rollers to create pressure between the rollers, a shaft slidable within said one of the rollers and adapted to rock said elements, and means on said cover engageable with said shaft for sliding the latter during pivotal movement of the cover to connect the tensioning means with said roller, said means being disengaged from said shaft to release said tensioning means upon bodily movement of said pivot.

15. In a wringer a frame, a pair of rollers each removably mounted on said frame, tensioning means carried by said frame, a cover pivotally connected with said frame, rockable elements for connecting said tensioning means with one of said rollers to create pressure between the rollers, a shaft slidable within said one of the rollers and adapted to rock said elements, and means on said cover engageable with said shaft for sliding the latter during pivotal movement of the cover to connect the tensioning means with said roller.

16. In a wringer a frame, a pair of rollers each removably mounted on said frame, tensioning means carried by said frame, a cover carried by a floating pivot connected with said frame, a shaft slidable within one of said rollers, rockable elements carried by said shaft and adapted to be rocked upon sliding of the shaft, said elements when rocked connecting said shaft with said tensioning means, means on said cover for engaging said shaft to slide the latter during pivotal movement of the cover, and means for latching the cover to retain it while said shaft is shifted.

17. In a wringer a frame, a pair of rollers each removably mounted on said frame, tensioning means carried by said frame, a cover carried by a floating pivot connected with said frame, a shaft slidable within one of said rollers, rockable elements carried by said shaft and adapted to be rocked upon sliding of the shaft, said elements when rocked connecting said shaft with said tensioning means, means on said cover for engaging said shaft to slide the latter during pivotal movement of the cover, and means for latching the cover to retain it while said shaft is shifted, said means on the cover being disengaged from said shaft to effect release of said tensioning means and said latching means upon striking the cover to shift its floating pivot.

18. In a wringer a frame, a pair of rollers each removably mounted on said frame, tensioning means carried by said frame, a cover having a pin and slot pivotal connection with said frame, resilient means normally elevating the pivot of said cover, means for releasably connecting said tensioning means with one of said rollers, means on said cover for operating said connecting means upon pivotal movement of the cover, said last recited means being rendered ineffective and permitting release of said connecting means upon depression of the pivot of said cover.

19. In a wringer a pair of rollers, operating means including a driving gear, a driven gear on one of said rollers adapted to mesh with said driving gear, resilient means urging and normally holding said gears out of mesh, and independent, resilient tensioning means rendered effective at will for forcing said rollers together, said gears being brought into mesh upon rendering said tensioning means effective.

20. In a wringer a pair of rollers, operating means including a driving gear, a driven gear on an end of one of said rollers, adapted to mesh with said driving gear, means urging and normally holding said end of said roller elevated to disengage said driving and driven gears, and independent, resilient means for applying pressure between the rollers and simultaneously rendering said holding means ineffective.

21. In a wringer a pair of rollers, operating means including a driving gear, a driven gear on one of said rollers adapted to mesh with said driving gear, resilient means urging and normally holding said gears out of mesh, and independent, resilient tensioning means adapted to be detachably connected with the other of said rollers to force it against said one roller, said tensioning means overcoming said resilient means and forcing said gears into mesh.

22. In a wringer a pair of rollers, means for driving said rollers in either direction, a clutch including a grooved rotatable element shiftable to determine the direction of rotation of said rollers, fixed drainage means beneath said rollers for conveying water to either side of the wringer, a small pivoted deflector associated with said drainage means in the path of the water for directing it to one side or the other, a shaft connected with said deflector, means carried by said shaft cooperating with the groove in said element to rock said deflector in accordance with the position of the element, and means for shifting said element and through the latter rocking said shaft.

23. In a wringer a pair of rollers, means for driving said rollers in either direction, a clutch shiftable to determine the direction of rotation of said rollers, clothes guides on either side of said rollers, fixed drainage channels beneath said clothes guides to convey water to either side, a small pivoted deflector associated with said drainage means in the path of the water for directing it to one side or the other, means controlled by said clutch for rocking said deflector, and means for shifting said clutch and through the latter rocking said deflector.

24. A wringer comprising a frame, a pair of rollers, detachable unitary means carried by said frame for retaining both of said rollers, fixed abutment means on said detachable means for one of said rollers, and spring means carried by said detachable means for tensioning said rollers.

25. In a wringer a frame, a pair of rollers, a spring unit detachably connected with said frame, said unit including a spring and comprising relatively movable parts adapted to retain said spring under tension when the unit is removed from the frame, and means carried by one of said parts for detachably connecting the latter with one of the rollers.

26. In a wringer a frame, a pair of rollers, a spring unit detachably connected with said frame, said unit including a coil spring arranged to be placed under tension when the unit is detached, said unit having relatively movable portions held together by said spring, and means for connecting one of said portions with the frame and the other portion with one of the rollers.

27. In a wringer a pair of rollers, and a spring unit comprising a pair of relatively movable members, spring means for drawing said members together, each of said members being adapted to retain an end of one of said rollers, said members having opposed shoulders cooperating with said rollers to hold their ends together.

28. A wringer comprising a pressed metal frame, roller retaining means detachably carried by said frame adjacent each end, spring means mounted on said retaining means, and said retaining means including relatively movable members having opposed shoulders drawn together by said spring means and engaging the ends of said rollers to hold them together.

29. In a wringer a frame, a cover member pivotally attached to said frame, a pair of rollers mounted in said frame, spring means associated with both ends of said rollers mounted independently of said cover member and connections from said cover member operating at a substantial mechanical advantage for tensioning said spring means and applying pressure between said rollers upon pivotal movement of said member.

30. In a wringer a frame, a member hingedly connected with said frame, a pair of rollers mounted in said frame, spring means associated with both ends of said rollers mounted independently of said member, connections operating at a substantial mechanical advantage upon pivotal movement of said member for tensioning said spring means and applying pressure between said rollers, and latch means for retaining said spring means under tension.

THOMAS W. BEHAN.